United States Patent [19]

Sugiyama

[11] Patent Number: 4,935,680

[45] Date of Patent: Jun. 19, 1990

[54] HEADREST CONTROL SYSTEM FOR MOTOR VEHICLE

[75] Inventor: Hiroshi Sugiyama, Ayase, Japan

[73] Assignee: Ikeda Bussan Company, Limited, Ayase, Japan

[21] Appl. No.: 288,891

[22] Filed: Dec. 23, 1988

[30] Foreign Application Priority Data

Dec. 26, 1987 [JP] Japan .................................. 62-331538

[51] Int. Cl.$^5$ ............................................ G06B 19/10
[52] U.S. Cl. .................................. 318/567; 318/646; 297/403; 297/410; 364/424.05
[58] Field of Search ............................... 318/560–568, 318/569, 466–468, 600–602, 626, 646; 296/63–65.1; 297/61, 391, 403, 406, 408, 410; 364/424.05, 424.01, 424.02, 425

[56] References Cited

U.S. PATENT DOCUMENTS

| 4,267,494 | 1/1979 | Matsuoka et al. | 318/568.1 |
| 4,659,145 | 4/1987 | Obersteiner | 318/568.1 |
| 4,797,824 | 1/1989 | Sugiyama et al. | 318/467 |
| 4,811,226 | 3/1989 | Shinohara | 318/466 |

Primary Examiner—William M. Shoop, Jr.
Assistant Examiner—David Martin
Attorney, Agent, or Firm—Foley & Lardner, Schwartz, Jeffery, Schwaab, Mack, Blumenthal & Evans

[57] ABSTRACT

A headrest control system for a motor vehicle equipped with a driver's seat and rear seats having adjustable headrests mounted thereon is disclosed which includes a driving motor for moving the headrest of the rear seat between an operative position for use and an inoperative retracted position, a first switch provided for actuating the driving motor, a second switch for actuating the driving motor, a memory for storing data of an optimum operative position of the headrest, and a sensor for detecting whether the rear seat is occupied by a passenger or not. A computerized controller is provided for controlling the driving motor in response to manipulation of the first switch so that the headrest is moved in correspondence to the manipulation of the first switch, controlling the driving motor on the basis of the data of the operative position stored in the memory to thereby move the headrest to the optimum operative position when occupation of the rear seat by a passenger is detected by the detecting means, and controlling the driving motor such that the headrest is moved to the inoperative retracted position in response to manipulation of the second switch so long as absence of passenger on the rear seat is detected by the detecting means.

11 Claims, 8 Drawing Sheets

LEFT REAR SEAT
HEADREST DRIVE CIRCUIT

FIG 8

ASSISTANT'S SEAT
HEADREST DRIVE CIRCUIT

HEADREST CONTROL SYSTEM FOR MOTOR VEHICLE

BACKGROUND OF THE INVENTION

A. Field of the Invention

The present invention relates to a headrest control system for controlling the positions of headrests mounted on seats of a motor vehicle such as a passenger car.

B. Description of the Prior Art

In general, both the front and rear seats in many passenger transporting vehicles such as automobiles are provided with respective headrests so that passengers sitting on the rear seats can enjoy a comfortable ride by leaning their heads on the headrests. However, since the headrest is mounted on the seat back at the top thereof, there arises a problem in that the field of view or visibility of the passengers and the driver can be obstructed by the headrests of seats which are not occupied. Accordingly, the headrest of a seat unoccupied by any passenger should desirably be retracted from the top of the seat back by displacing the headrest downwardly or tilting it forward or backward.

There is known an apparatus in which an electric motor or an electromagnetic solenoid is employed in such an arrangement to allow the driver to retract the rear seat headrest by the operation of a switch to thereby ensure good visibility for the driver in the backward direction through an inside or rearview mirror. The headrest control apparatus known heretofore suffers from the difficulty that a passenger sitting on the rear seat whose headrest is fully retracted to the housed position may find the procedure for adjusting the headrest to the position optimal for the passenger troublesome.

SUMMARY OF THE INVENTION

In view of the problems of the prior art mentioned above, it is an object of the present invention to provide a headrest control system which can ensure retraction of the headrest of the rear seat to the inoperative position as well as adjustment of the headrest at the optimal position in a simplified and convenient manner.

To accomplish the above object, there is provided according to a general aspect of the present invention a headrest control system for a motor vehicle equipped with a driver's seat and rear seats having respective headrests mounted thereon adjustably in respect to the positions thereof, which system comprises a driving means for moving the headrest of the rear seat selectively to an operative position for use or an inoperative position, a first switch provided in association with the rear seat for actuating the driving means, a second switch provided in association with the driver's seat for actuating the driving means, a memory means for storing data of the optimum position of the headrest, a detecting means for detecting whether the rear seat is occupied by a passenger, and a control means for controlling the driving means in response to manipulation of the first switch so that the headrest is moved in correspondence to the manipulation of the first switch, while controlling the driving means on the basis of the data of the optimum position stored in the memory means to thereby move the headrest to the operative position when occupation of the rear seat by a passenger is detected by the detecting means, and controlling the driving means such that the headrest is moved to the inoperative retracted position in response to manipulation of the second switch on the condition that absence of any passenger of the rear seat is detected by the detecting means.

With the arrangement of the headrest control system described above, a driver may fully retract the rear headrest when the rear seat is not occupied. When a passenger occupies a rear seat whose headrest is in the position retracted by a driver by operating the second switch, the headrest is automatically brought to the optimum position for use by the passenger without requiring the passenger to operate the first switch unless minor adjustments are needed.

DESCRIPTION OF THE PREFERRED EMBODIMENTS

Figure 1A:
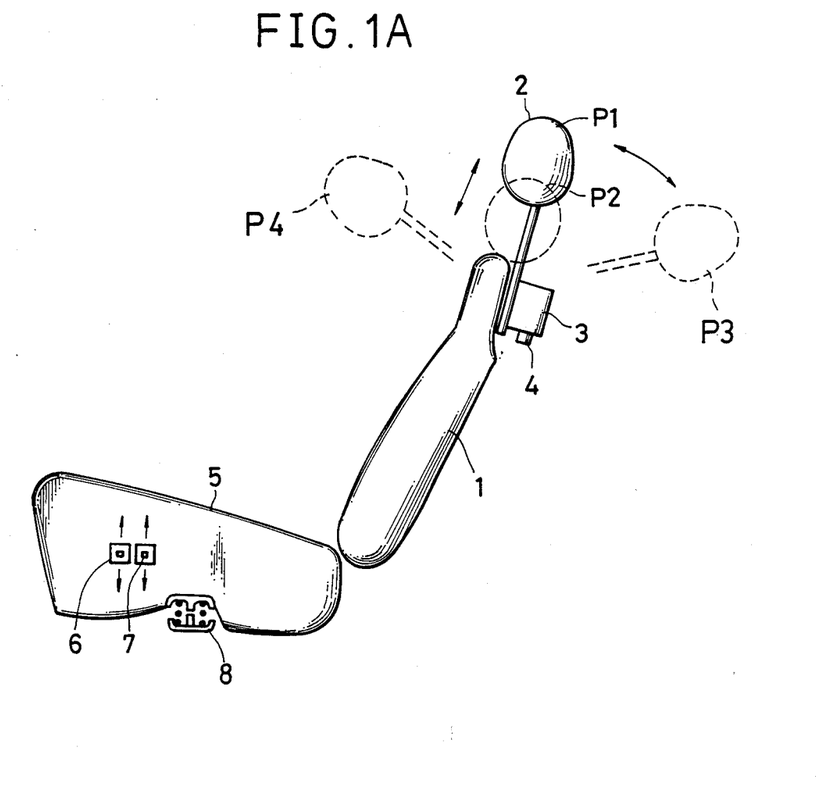
FIG. 1A is a schematic side view of a rear seat for a motor vehicle to which the headrest control system according to the invention is applied.

The present invention will now be described in detail in conjunction with exemplary and preferred embodiments thereof by reference to the drawings. FIG. 1 shows schematically a rear seat of a motor vehicle which is equipped with a headrest control system according to an embodiment of the invention, there is installed a reversible electric motor 3 on a rear side of a seat back 1 at a top end portion thereof for moving selectively a head rest 2 upwardly or downwardly between an upper limit position P1 and a lower limit or fully retracted position P2. The reversible motor 3 is provided with a rotary encoder 4 for the purpose of detecting the position of the headrest 2. A reference numeral 5 denotes a seat cushion having a side portion on which there are installed a headrest driving switch 6 constituting a first switch for driving the motor 3 to thereby move selectively the associated headrest 2 upwardly or downwardly and a switch 7 for moving a headrest of an assistant driver's seat upwardly or downwardly, as will be made more apparent later on.

In the case of the illustrated embodiment, each of the switches 6 and 7 may preferably be realized in the form of a slide type switch adapted to assume a "forward" position at which the motor is rotated in the forward direction to thereby cause the headrest to move upwardly and a "reverse" position at which the motor is rotated in the reverse direction to thereby cause the headrest to move downwardly, wherein the change-over of the switch between the two positions mentioned above is effected with the aid of a slidable manipulating member, as will be described in more detail hereinafter. Since such type of switch itself is known in the art, any further description thereof will be unnecessary.

A body pressure (or weight) sensor 8 is installed in the vicinity of the bottom surface of the seat cushion 5 for detecting the occupation of the seat by a passenger. This sensor 8 may preferably be constituted by a switch which is so designed that a detection signal (ON signal) is produced when pressure, for example, of about 20 kg as a threshold level is applied to the seat cushion 5. With the aid of the sensor or switch of such structure, it is possible to identify discriminatively whether an adult of a child passenger is sitting on the seat, in dependence on whether the sensor switch is closed (ON state) or remains open (OFF state).

It should here be mentioned that the headrest to which the invention is applied is not restricted to the vertically movable type illustrated in FIG. 1A, but the invention can equally be applied to such a headrest which is adapted to be tilted forwardly or rearwardly relative to the seat cushion 5 as illustrated by the dotted outlines P3 and P4 in FIG. 1A. Similarly, the switches 6 and 7 are not restricted to the slide type switches. Other known types of switches such as momentary type switch or a push-button type switch and others can equally be employed. Further, these switches may be installed on the rear side of a back of a seat disposed in front of the seat now under consideration or alternatively in a door trim. Of course, the body pressure (weight) sensor 8 is not restricted to the structure mentioned above.

Figure 1B:
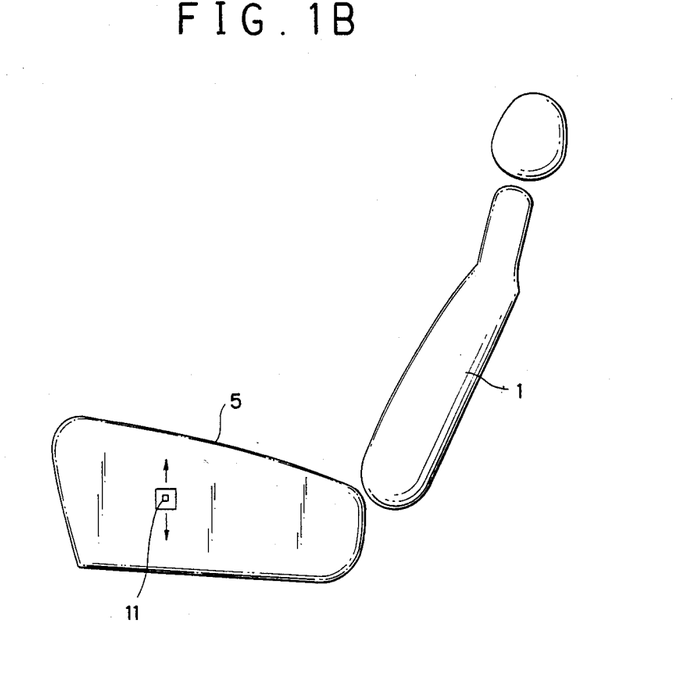
FIG. 1B is a schematic view of a drivers seat for a motor vehicle.

The seat described above can be mounted as a rear seat within the motor vehicle on the left and right sides, respectively. Further, the seat may be installed to as an assistant driver's seat. In that case, the switch 6 may be removed. FIG. 1B illustrates a driver's seat provided with a driver operation switch 11 as a second switch for activating the motor 3 of the rear seat.

Next, a structure of the headrest control system according to an embodiment of the present invention will be described with reference to FIG. 2. The illustrated headrest control system comprises a right rear headrest input circuit 10R, a left rear headrest input circuit 10L, an assistant driver's headrest input circuit 10A, a driver operation switch 11 installed in association with the driver's seat and constituting a second switch, a microcomputer 20, a right rear headrest drive circuit 30R, a left rear headrest driver circuit 30L and an assistant driver's headrest drive circuit 30A.

Figure 2:
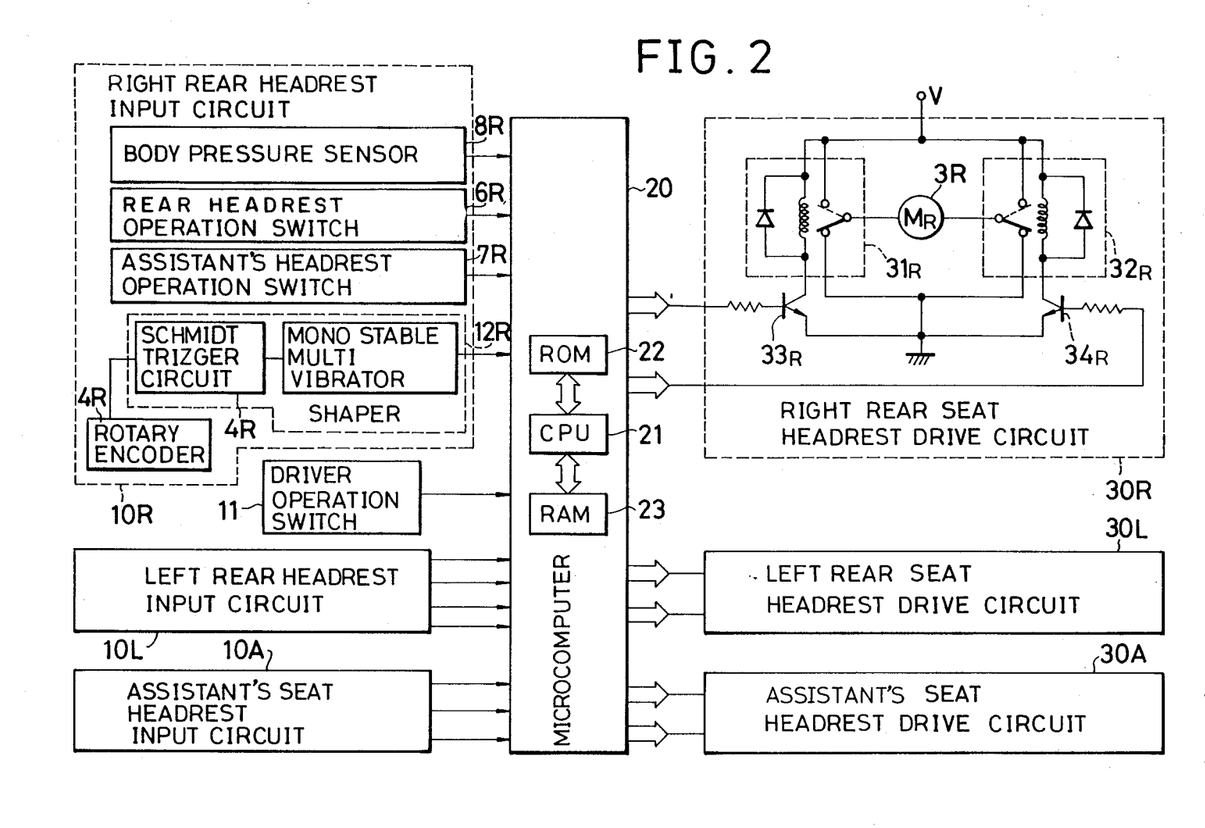
FIG. 2 is a block diagram showing a general arrangement of the headrest control system according to an embodiment of the present invention.

The right rear headrest input circuit 10R includes a body pressure (weight) sensor 8R mounted on a right rear seat, a right rear headrest drive switch 6R, an assistant driver's headrest drive switch 7R, a rotary encoder 4R mounted in association with a right-hand motor 3R and a shaping circuit 12R for shaping a wave form of the pulse signal generated by the rotary encoder 4R, as will be seen in FIG. 2 at an upper left portion thereof, wherein output signals of these circuits are inputted to the microcomputer 20.

Figure 5:
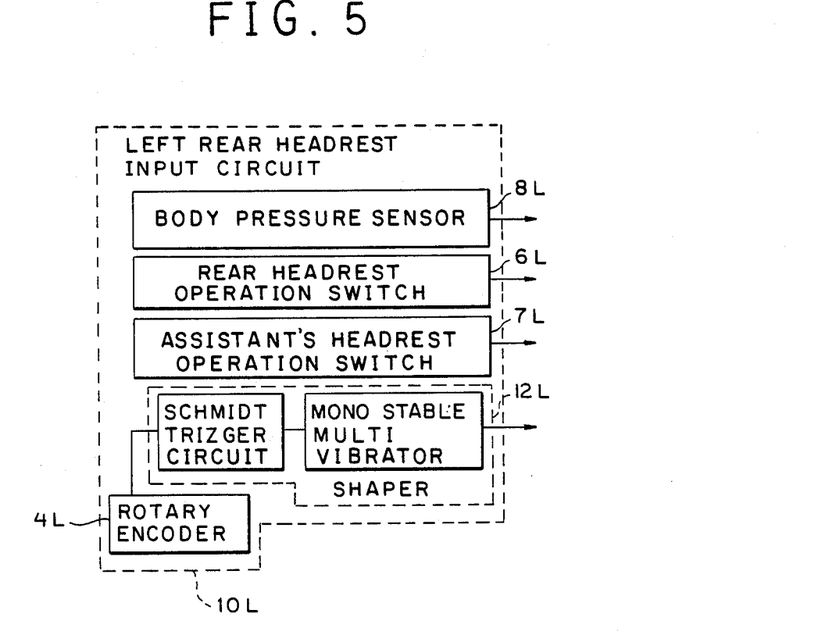
FIGS. 5-8 are block diagrams of the left rear headrest input circuit, assistant's seat headrest input circuit, left rear headrest drive circuit and assistant's seat headrest drive circuit illustrated in FIG. 2, respectively.

The left rear headrest input circuit 10L is implemented in a configuration similar to that of the right rear input circuit 10R mentioned above, as shown in FIG. 5. The left rear headrest input circuit 10L is composed of a body pressure sensor (designated by 8L for discrimination from the similar body pressure sensor 8R of the right rear headrest input circuit 10R mentioned above, corresponding designation being adopted for the components mention below), a left rear headrest drive switch 6L, an assistant's seat headrest drive switch 7L, a rotary encoder 4L mounted on the left-hand motor 3L and a shaping circuit 12L for shaping the pulse signal generated by the rotary encoder 4L, as will be described hereinafter.

Figure 6:
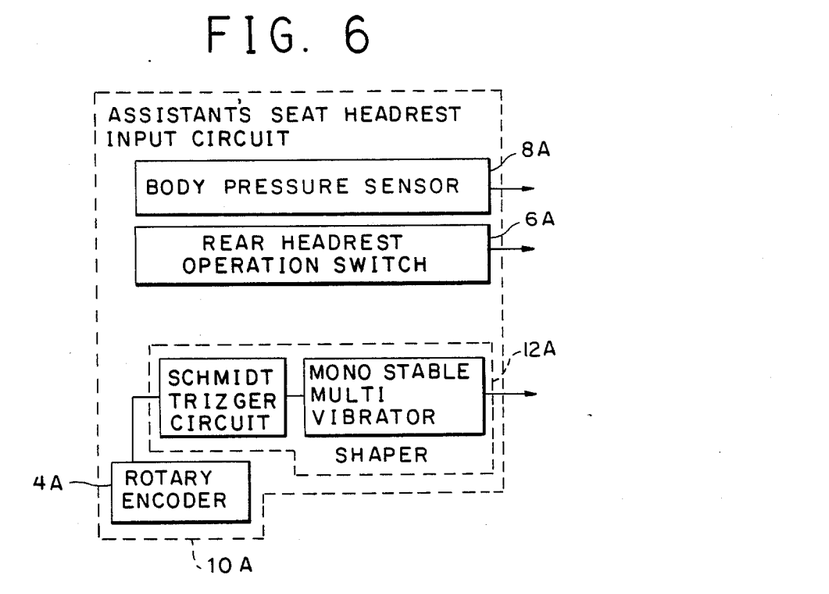

Further, the assistant driver's headrest input circuit 10A as shown in FIG. 6 is composed of a body pressure (weight) sensor (designated by 8A for discrimination from the body pressure sensors 8R and 8L, same suffix A being used for the other components mentioned below), an assistant driver's headrest drive switch 7A, a rotary encoder 4A mounted in association with the motor for the assistant's seat headrest 3A, and a pulse shaper circuit 12A for shaping waveform of the pulse signal generated by the encoder 4A. In the case of the illustrated embodiment, however, the assistant's seat headrest input circuit 10A includes no switch that corresponds to the rear headrest drive switches 6.

Figure 3A:
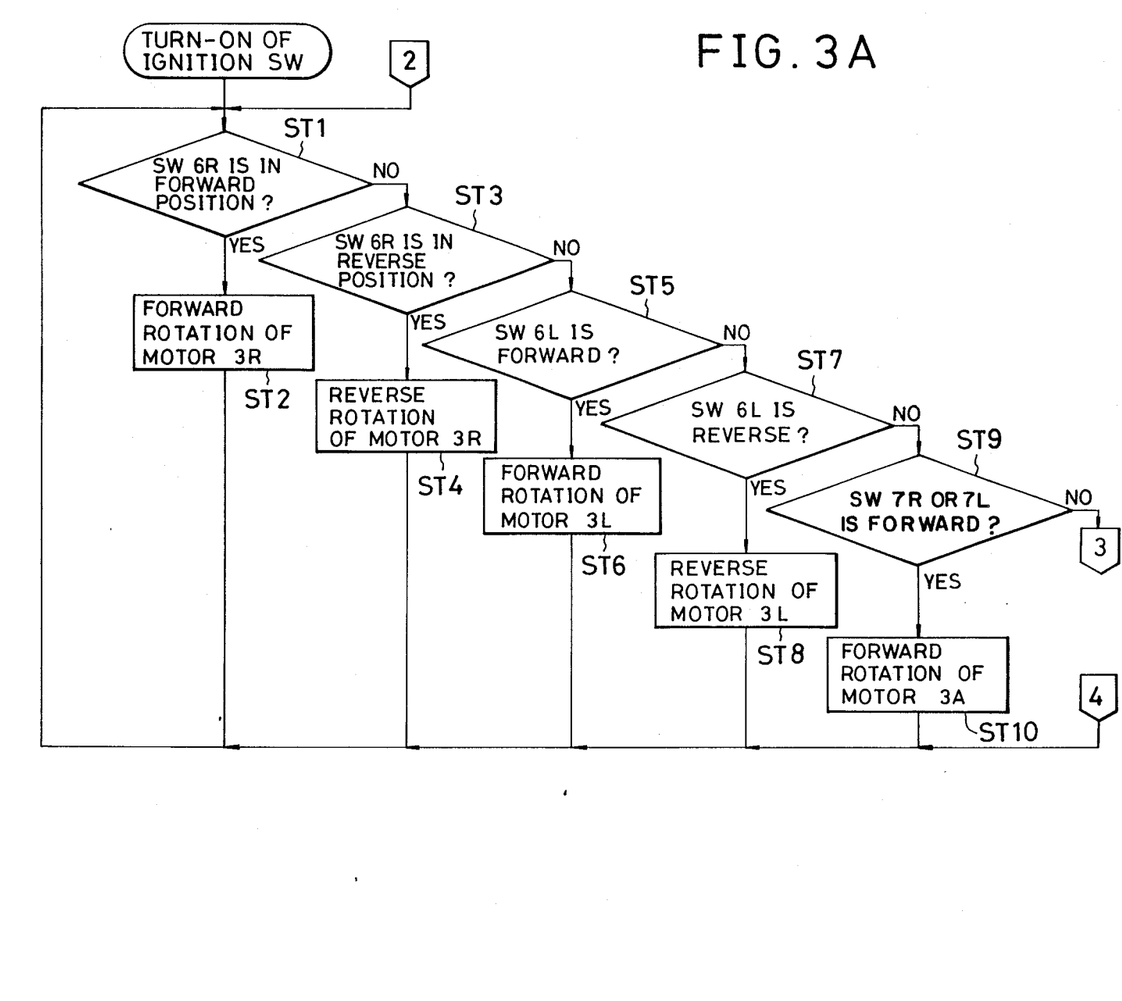
FIGS. 3A, 3B and 4 are flow charts for illustrating operation of the headrest control system shown in FIG. 2.
Figure 3B:
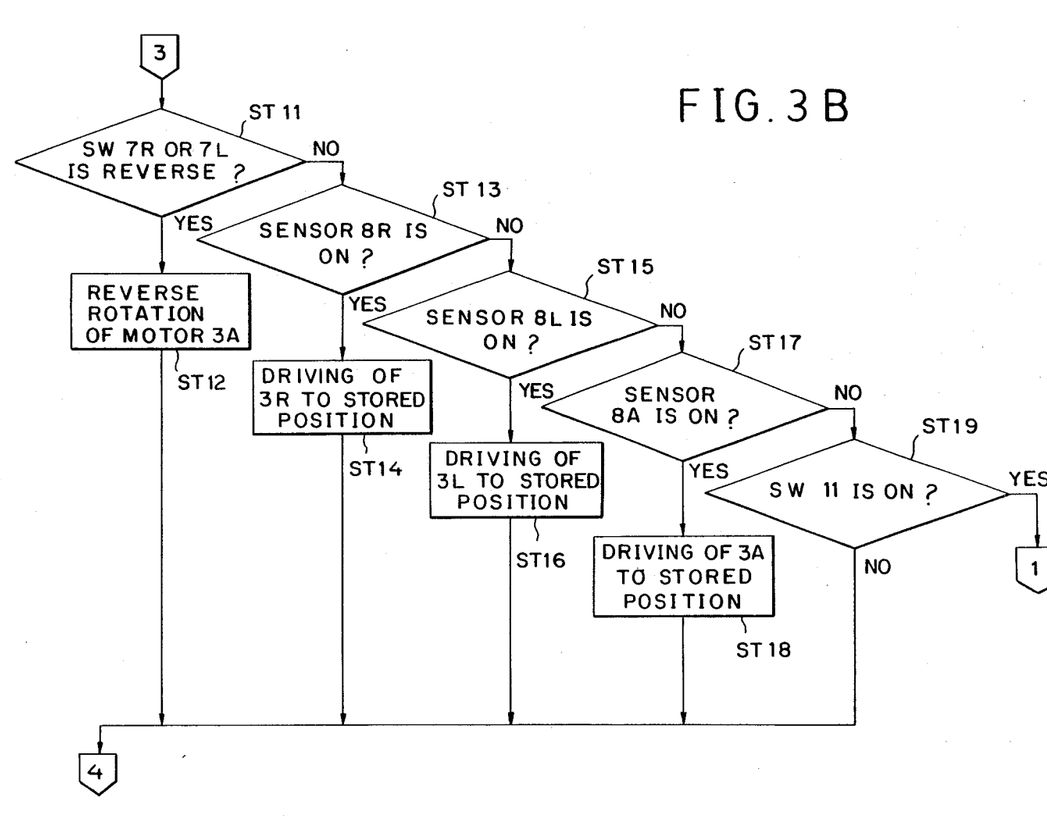
Figure 4:
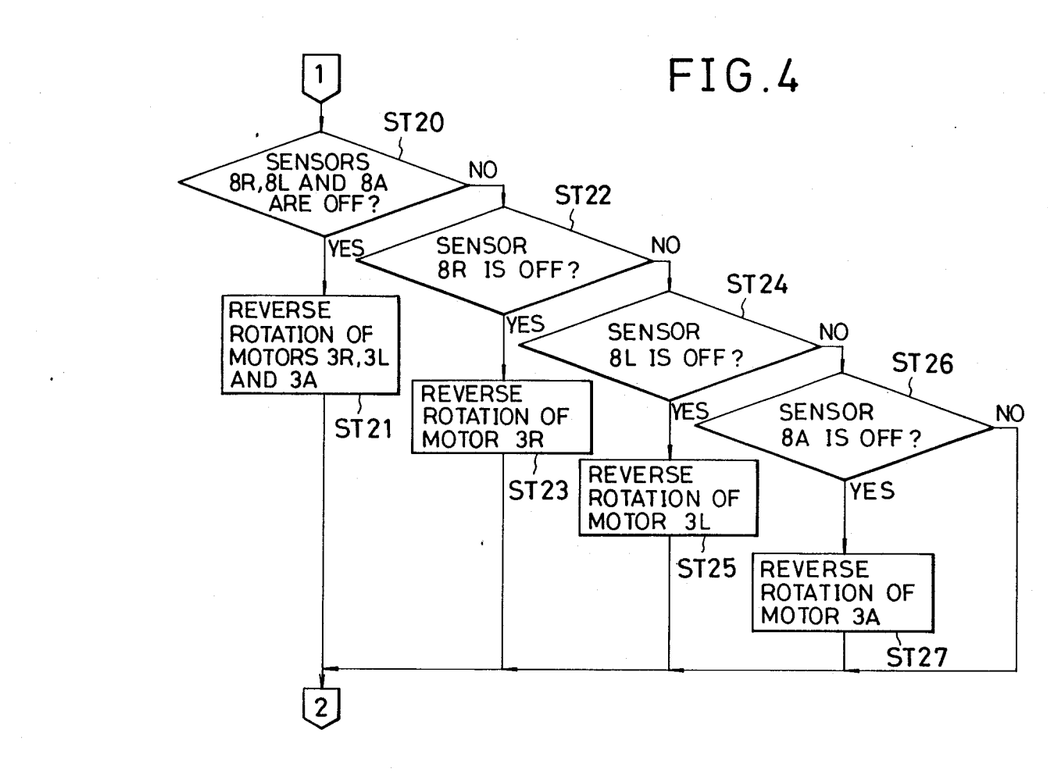

The microcomputer 20 includes a central processing unit (CPU) 21, a read-only memory (ROM) 22 for storing programs such as those illustrated in FIGS. 3 and 4 and a random access memory (RAM) having areas for storing data representative of the upper limit positions $P_1$, the lower limit positions $P_2$ and the final positions of the left and right rear headrests and the assistant's seat headrest, respectively, and other data as well as work areas for the CPU 21.

Additionally, the microcomputer 20 includes an input port for fetching the signals outputted from the input circuits 10R, 10L and 10A mentioned above and an output port for issuing headrest drive command signals to the left and right rear headrest drive circuits 30R, 30L and the assistant's head rest drive circuit 30A, respectively, although these ports are not shown.

The right rear headrest drive circuit 30R includes a relay circuit 31R connected to a power supply source (+V) such as an onboard battery or the like for driving the right-hand motor 3R in the forward direction to thereby move the right rear seat headrest upward, a relay circuit 32R also connected to the power supply source (+V) for rotating the right-hand motor 3R in the reverse direction to thereby move the right rear seat headrest downward, and transistors 33R and 34R serving for selective energization (ON) and deenergization (OFF) of the relay circuits 31R and 32R, wherein the transistors 33R and 34R have respective bases connected to command outputs of the microcomputer 20.

Figure 7:
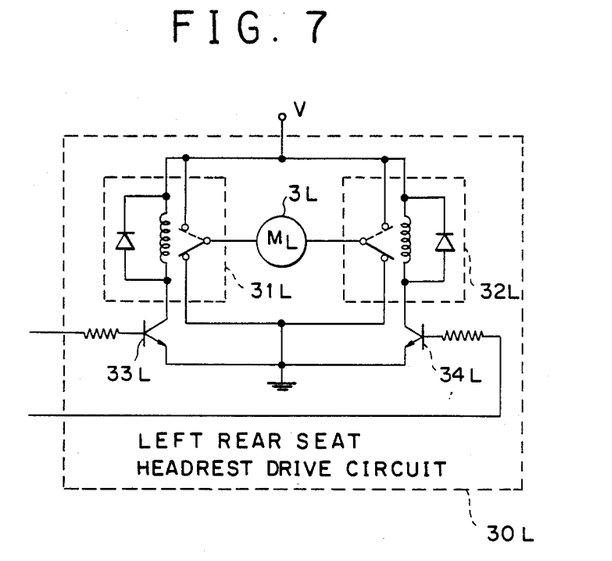
Figure 8:
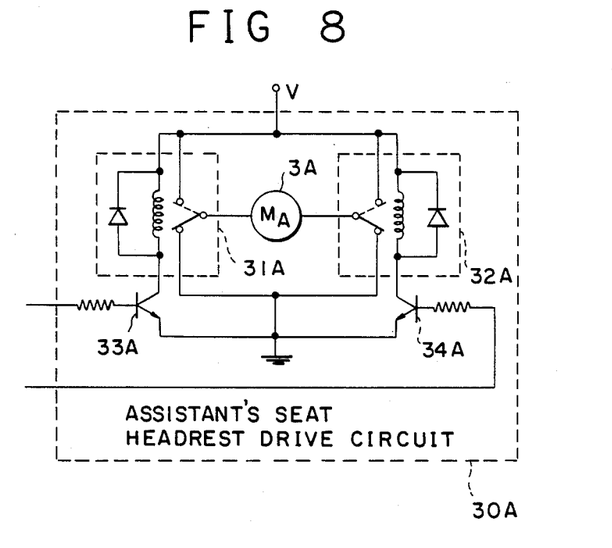

Since the left rear headrest drive circuit 30L and the assistant driver's headrest drive circuit 30A (illustrated in FIGS. 7 and 8) are each realized in a structure identical with that of the right rear headrest drive circuit 30R, further description of the former will be unnecessary.

Now, operation of the headrest control system of the structure described above will be elucidated with emphasis being put on the operation of the CPU 21 constituting the heart of the microcomputer 20 by reference to FIGS. 3A, 3B and 4.

Referring to FIGS. 3A and 3B the headrest control system is set to operating state when an ignition switch (not shown) of the motor vehicle is turned on, whereupon a processing step ST1 is executed by the CPU 21 for deciding whether the switch 6A of the right rear headrest input circuit 10R is in the position to move upwardly the associated headrest (the forward position mentioned hereinbefore).

If the result of the decision step ST10 is affirmative (Y), the program proceeds to a step ST2 where the transistor 33R of the right rear seat headrest drive circuit 30R is turned on to rotate the motor 3R in the forward direction for thereby moving the right rear seat headrest upwardly.

So long as the switch 6R is held continuously at the forward position, the right rear seat headrest moves upward continuously through a loop constituted by the steps ST1, ST2 and ST1. When the switch 6R is turned off, the transistor 33R becomes nonconductive to stop the motor 3R, whereupon the right rear headrest stops. At this time point, the CPU 21 fetches from the output of the encoder 4R the stop position data representing the position at which the right rear seat headrest stopped, the data being then stored as optimum in the position data RAM 23.

In this case, when the right rear seat headrest has moved to the upper limit position $P_1$, the motor 3R stops preventing the motor from being overloaded.

When it is found at the step ST1 that the switch 6R is not in the forward position for moving upwardly the headrest, the program proceeds to a step ST3 where it is checked whether or not the switch 6R is in the position to move the headrest downward (i.e., the reverse position mentioned hereinbefore). If the answer of this decision step ST3 is affirmative (Y), the program proceeds to a step ST4 where the transistor 34R of the right rear headrest drive circuit 30R is turned on to rotate the motor 3R in the reverse direction for thereby moving downwardly the right rear seat headrest. Thereafter, return is made to the step ST1.

So long as the switch 6R is held continuously in the reverse position to move the headrest downwardly, the right rear seat headrest is continuously moved downwardly until the switch 6R is turned off, whereupon the transistor 34R becomes nonconductive to thereby stop the motor 3R and hence the downward movement of the right rear seat headrest. At this time point, the CPU 21 fetches the stop position data from the output of the encoder 4R, which data is then stored in the RAM 23.

When it is found at the step ST3 that the switch 6R is not in the reverse position to move the associated headrest downwardly, the program jumps to the step ST5 where it is checked whether the left rear seat headrest operating switch 6L of the left rear headrest input circuit 10L is in the forward position to move the associated headrest upwardly.

In case the result of the decision step ST5 is affirmative (Y), the program proceeds to a step ST6 at which the transistor 33L of the left rear headrest drive circuit 30L is turned on, whereby the motor 3L is rotated in the forward direction to move the left rear seat headrest upwardly.

So long as the switch 6L is continuously held in the forward position, the left rear headrest is continuously moved upwardly through a loop formed by the steps ST5, ST6, ST1, ST3 and ST5 until the switch 6L is opened, whereupon the transistor 33L becomes nonconductive to stop the motor 6L and hence the left rear headrest. At this time point, the stop position data is fetched from the output of the rotary encoder 4L to be stored in the RAM 23.

On the other hand, when it is found at the step ST5 that the switch 6L is not in the forward position to move upwardly the associated headrest, the program proceeds to the step ST7 at which it is checked whether the switch 6L is in the reverse position to move downwardly the associated headrest. If the answer of this decision step ST7 is affirmative (Y), the program proceeds to a step ST8 at which the transistor 34L of the left rear headrest drive circuit 30L is turned on to rotate the motor 3L in the reverse direction to thereby move downwardly the left rear seat headrest. Thereafter, return is made to the step ST1.

On the other hand, when it is found at the step ST7 that the switch 6L is not in the reverse position to move downwardly the associated headrest, the program jumps to a step ST9 where decision is made as to whether either the assistant's seat headrest operation switch 7R belonging to the right rear headrest input circuit 10R or the assistant's seat headrest operation switch 7L belonging to the left rear headrest input circuit 10L is in the forward position to move upwardly the assistant's seat headrest.

When the answer of the decision step ST7 is affirmative, the program proceeds to a step ST10 at which the transistor 33A of the assistant's seat headrest drive circuit 30A is turned on to rotate the motor 3A in the forward direction for thereby moving upwardly the assistant's seat headrest. Thereafter, the step ST1 is regained. On the other hand, when either one of the assistant's seat headrest operation switches 7R and 7L is in the reverse position to move downwardly the assistant's seat headrest, the program proceeds from the step ST11 to a step ST12 where the motor 3A is rotated in the reverse direction to thereby move downwardly the assistant's seat headrest. Subsequently, return is made to the step ST1.

In case it is found at the step ST11 that neither the assistant's seat headrest drive switch 7R nor 7L is actuated, the program proceeds to a step ST13 where it is checked whether the body pressure sensor 8R of the right rear headrest input 10R is closed or not.

When the body pressure sensor 8R is closed (in the ON state), the program proceeds to a step ST14 at which the motor 3R is rotated in the forward or reverse direction in accordance with the last stop position data or optimum position data of the right rear seat headrest as stored in the RAM 23 to thereby stop the right rear seat headrest at the position indicated by the data. Thereafter, return is made to the step ST1.

In case the body pressure sensor 8R is found as being open at the step ST13, the program proceeds to a step ST15 at which time a decision is made as to whether the body pressure sensor 8L of the left rear headrest input circuit 10L is closed or not.

When the body pressure sensor 8L is closed, the program proceeds to a step ST16 at which the motor 3L is rotated in the forward or reverse direction in dependence on the last stop position of the left rear seat headrest stored in the RAM 23 to thereby position correspondingly the left rear seat headrest, whereupon return is made to the step ST1.

In this way, when a passenger who has occupied either the right or left rear seat most recently sits in the seat, the rear seat headrests can automatically be restored to the desired position (steps ST13 to ST16).

On the other hand, when the seat is occupied by a passenger who was not the last occupant, he or she can finely adjust the right rear headrest to a desired position by setting the right rear headrest operation switch 6R selectively to the forward or reverse position, as occasion requires (steps ST1 to ST4). Similarly, a passenger sitting on the left rear seat can finely adjust the left rear seat headrest to a desired position by moving the left rear headrest operation switch 6L to the forward or reverse position, as desired (ST5 to ST8).

Further, unless the assistant driver's seat is occupied, any of the passengers sitting on the right and left rear seats can move the assistant's seat headrest to a desired position by correspondingly manipulating the associated assistant seat headrest operation switch 7R or 7L so that a good forward visibility can be assured (steps ST9 to ST12).

When it is found at the step ST15 that the body pressure sensor 8L is open, the program proceeds to a step ST17 where decision is made as to whether the body pressure sensor 8A of the assistant's seat headrest input circuit 10A is closed or opened.

When the body pressure sensor 8A is closed, the program proceeds to a step ST18 where the motor 3A is rotated forwardly or reversely on the basis of the last stop position data of the assistant's seat headrest as stored in the RAM 23, to thereby stop the assistant's seat headrest at the corresponding position, whereupon the step ST1 is regained.

In this way, when the assistant's seat occupied by a passenger is the last one remaining empty, the headrest of that seat can automatically be set at a desired position.

In this conjunction, it should be mentioned that the assistant's seat headrest may also be so implemented as to be susceptible to the fine positional adjustment as in the case of the rear seat headrests.

When it is found at a step ST17 that the body pressure sensor 8A is opened, the program proceeds to a step ST19 where it is checked whether the driver's operation switch 11 is closed or not. If it is closed, the program proceeds to steps ST20 et seq. shown in FIG. 4. On the other hand, the step ST1 is regained when the switch 11 is opened.

At the step ST20, it is decided whether all the body pressure sensors 8R, 8L and 8A of the rear seats and the assistant driver's seat are open or not. When all the body pressure sensors 8R, 8L and 8A are opened, the program proceeds to a step ST21 where all the motors 3R, 3L and 3A are simultaneously rotated in the reverse direction to thereby move downwardly all the associated headrests simultaneously. Subsequently, return is made to the step ST1.

So long as the body pressure sensors 8R, 8L and 8A are in the open state, the associated headrests are continuously moved downwardly through a loop established by way of the steps ST20, ST21, ST1, ST3, ST5, ST7, ST9, ST11, ST13, ST15, ST17, ST19 and ST20. When the headrests have attained the respective lower limit positions P2 or the fully retracted position, the motors 3R, 3L and 3A stop.

On the other hand, unless all the body pressure sensors 8R, 8L and 8A are open at the step ST20, the program proceeds to a step ST22 where it is checked whether the body pressure sensor 8R of the right rear headrest input circuit 10R is open or not. If the body pressure sensor 8R is open, the program proceeds to a step ST23 where the right rear headrest is moved downwardly by rotating the motor 3R in the reverse direction to thereby move the right rear seat headrest downwardly. When the right rear seat headrest has attained the lower limit position $P_1$, the motor 3R is stopped.

Similarly, when it is found at the steps ST24 and ST25 that the body pressure sensor 8L of the left rear headrest input circuit 10L is open, the left rear seat headrest is moved downwardly to the lower limit position $P_1$, being followed by steps ST26 and ST27 where the assistant's seat headrest is moved downwardly to the lower limit position $P_1$ in the case the body pressure sensor 8A is open.

As will be appreciated from the above description, the driver can move downwardly the headrest(s) by operating the switch 11, whereby a good backward visibility can be assured by way of an inside mirror when driving forward or directly when the motor vehicle is to be driven backward.

In the foregoing description, it has been assumed that the headrests of the rear seats and that of the assistant driver's seat are subjected to the control. It should however be appreciated that the headrest operation switch and other may also be provided for the driver's seat for ensuring adjustability of the driver's seat headrest to the optimum position.

Although the invention has been described in conjunction with the preferred embodiments thereof, it should be understood that various changes and modifications may readily be made by those skilled in the art without departing from the spirit and scope of the invention set forth in the claims.

What is claimed is:

1. A headrest control system for a motor vehicle equipped with a driver's seat and at least one rear seat having an adjustable headrest mounted thereon comprising:
   driving means for moving the headrest of the rear seat between an operative position for use and an inoperative retracted position;
   a first switch for actuating said driving means;
   a second switch for actuating said driving means;
   memory means for storing data indicative of the operative position of the headrest that is an optimum position for a given passenger;
   detecting means for detecting whether said rear seat is occupied by a passenger; and
   control means for controlling said driving means in response to manipulation of said first switch so that said headrest is moved in a direction which corresponds to the manipulation of said first switch, controlling said driving means on the basis of said data of the optimum position stored in said memory means to thereby move said headrest to said operative position when occupation of the rear seat by a passenger is detected by said detecting means, and controlling said driving means such that said headrest is moved to said inoperative retracted position in response to manipulation of said second switch on the condition that absence of passenger on said rear seat is detected by said detecting means.

2. A headrest control system according to claim 1, wherein said detecting means comprises a weight sensor mounted in a cushion of said rear seat.

3. A headrest control system according to claim 1, wherein said driving means selectively moves said headrest in an upward or downward direction when actuated.

4. A headrest control system according to claim 3, further including means for measuring the optimum position of said headrest to be stored in said memory means.

5. A headrest control system according to claim 1, wherein said driving means selectively moves said headrest in a forward or backward direction when activated.

6. A headrest control system according to claim 5, further including means for measuring the optimum position of said headrest to be stored in said memory means.

7. A headrest control system according to claim 1, further including:
- second driving means for driving a headrest of an assistant driver's seat between an operative position for use and the inoperative retracted position;
- a third switch for actuating said second driving means;
- second detecting means for detecting whether or not the assistant drivers's seat is occupied by a passenger;
- wherein said control means responds to manipulation of said third switch by controlling said second driving means so that the headrest of said assistant driver's seat is moved in a direction corresponding to said manipulation of said third switch, and further controls said second driving means such that said headrest of the assistant driver's seat is moved to said inoperative retracted position in response to manipulation of said second switch on the condition that absence of a passenger on said assistant driver's seat is detected by said second detecting means.

8. A headrest control system according to claim 1, wherein said first switch is located such that it is operable by a passenger seated in said rear seat and said second switch is located such that it is operable by a driver sitting in said driver's seat.

9. A headrest control system according to claim 7, wherein said memory means further includes means for storing an optimum operative position data for said headrest of said assistant driver's seat, and said control means controls said second driving means in response to detection by said second detecting means of occupation of said assistant driver's seat by a passenger so that the headrest thereof is moved to the optimum operative position in accordance with the operative position data stored in said memory means.

10. A headrest control system for a motor vehicle equipped with a driver's seat and a rear seat having a headrest, comprising:
- driving means for moving the headrest at least between an optimum position for use and a fully retracted position;
- a first switch being provided with the rear seat for actuating said driving means;
- a second switch being provided with the driver's seat for actuating said driving means;
- memory means for storing an optimum position data of the headrest of the rear seat;
- detecting means for detecting whether the rear seat is occupied by a passenger; and
- control means for controlling said driving means so that the headrest of the rear seat moves in accordance with an intended direction of said first switch, so that when said detecting means detects that the rear seat is occupied, the head-rest of the rear seat moves to the optimum position in accordance with the data stored in said memory means, and so that when said second switch is operated and said detecting means does not detect that the rear seat is occupied, the headrest of the rear seat moves to the fully retracted position.

11. A headrest control system according to claim 10, further comprising:
- second driving means for moving a headrest of an assistant driver's seat at least between an optimum position for use and a fully retracted position;
- a third switch being provided for actuating said second driving means;
- second memory means for storing an optimum position data of the headrest of the assistant driver's seat;
- second detecting means for detecting whether the assistant seat is occupied by an assistant; and
- control means for controlling said second driving means so that the headrest of the assistant driver's seat moves in accordance with an intended direction of said third switch, so that when said second detecting means detects that the assistant seat is occupied, the headrest of the assistant seat moves to the optimum position in accordance with the data stored in said second memory means, and so that when said second switch is operated and said second detecting means has not detected that the assistant driver's seat is occupied, the headrest of the assistant driver's seat moves to the fully retracted position.

* * * * *